United States Patent [19]
Anderson et al.

[11] 3,790,938
[45] Feb. 5, 1974

[54] MOVING TARGET INDICATOR SYSTEM AND APPARATUS

[75] Inventors: Richard W. Anderson, Reading, Mass.; Bernard J. Weiss, Deerfield, N.H.; Hubert E. Holley, Melrose, Mass.

[73] Assignee: Cygned, Inc., Salem, N.H.

[22] Filed: May 25, 1972

[21] Appl. No.: 256,792

[52] U.S. Cl. ...... 343/7.7, 343/17.2 R, 343/112 CA, 343/761
[51] Int. Cl. ............................................. G01s 9/42
[58] Field of Search.....343/7.7, 17.2 R, 17.2 PC, 343/112 CA, 761, 833, 834, 837, 839

[56] References Cited
UNITED STATES PATENTS

| 3,386,095 | 5/1968 | Stevens | 343/7.7 X |
| 3,341,151 | 9/1967 | Kampinsky | 343/837 UX |
| 3,064,258 | 11/1962 | Hatkin | 343/839 X |
| 3,109,175 | 10/1963 | Lloyd | 343/833 X |

*Primary Examiner*—T. H. Tubbesing
*Attorney, Agent, or Firm*—Willis M. Ertman

[57] ABSTRACT

A moving target indicator system includes a signal source for generating an RF output signal, a code generator for generating a primary code train and a plurality of secondary code trains delayed relative to the primary code train, and modulator means responsive to the primary code train to modulate the RF output signal to produce a coded RF output signal. The coded RF output signal is transmitted and coded echo signals reflected by targets are compared with a selected secondary code train to produce a unipolar signal train with doppler modulation information if a matching relation exists between the coded echo signals and the secondary code train. The doppler modulation of the unipolar signal train is detected and a corresponding indicator is actuated.

25 Claims, 9 Drawing Figures

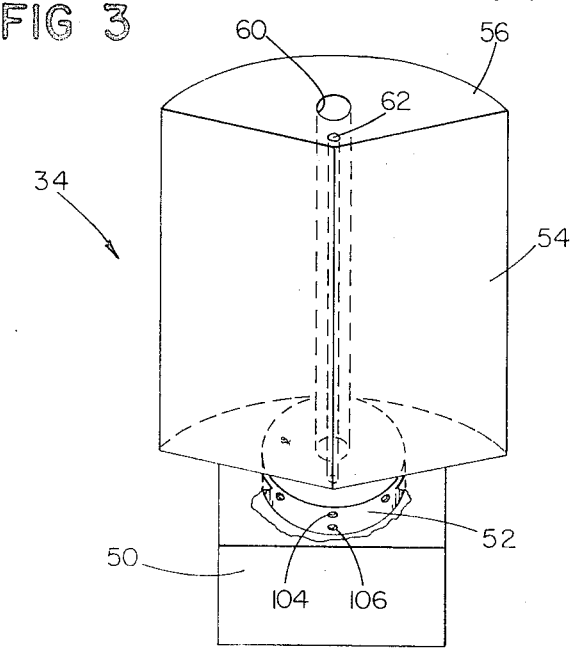
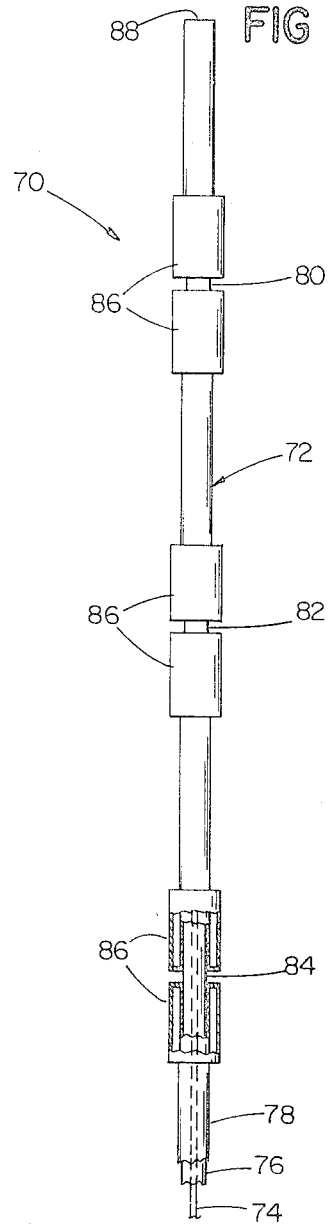
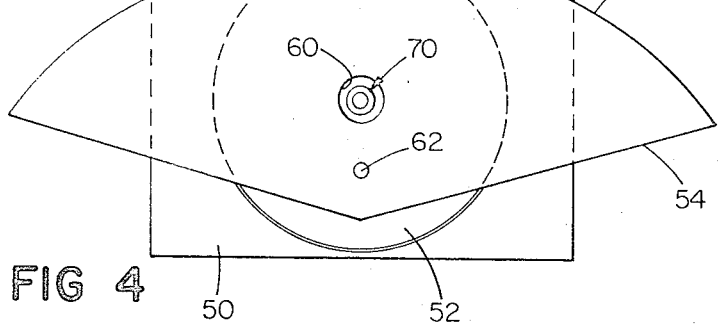
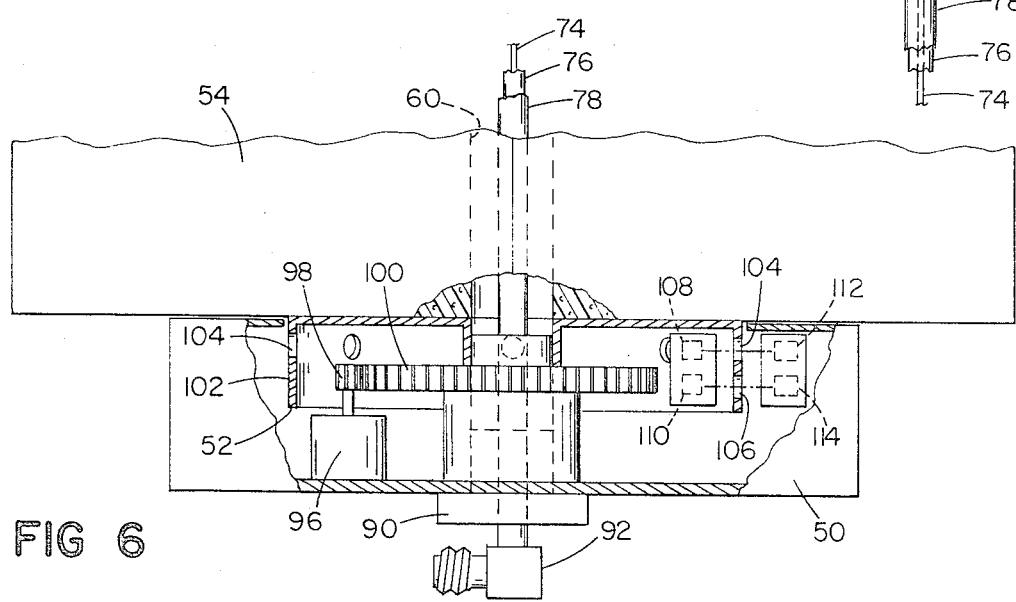

MOVING TARGET INDICATOR SYSTEM AND APPARATUS

SUMMARY OF THE INVENTION

This invention relates to moving target indicator systems and components thereof.

The problem of midair collisions of aircraft is of increasing concern. With the increasing amount of air traffic, the risk of midair collisions is becoming significantly greater, and it is an object of this invention to provide a novel and improved warning system for use in aircraft.

Another object of the invention is to provide a novel and improved moving target indicator system.

Still another object of the invention is to provide a novel and improved solid state airborne radar system that is light in weight and low in cost that is particularly useful for general aviation aircraft.

In accordance with one aspect of the invention there is provided a moving target indicator system that includes a signal source for generating an output signal, codegenerator means for generating a primary code train and at least one secondary code train delayed relative to the primary code train, and modulator means responsive to the primary code train to modulate the output signal of the signal source to produce a coded output signal. The system also includes antenna means for transmitting the coded output signal in a directional beam and for receiving signals reflected by a target, which reflected signals contain coded information. The reflected signals and the secondary code train are compared and a unipolar signal is produced upon detection of a matching relation between the coded signals and the secondary code train. Where the target is moving relative to the antenna, that unipolar signal train has doppler modulation information and a detector senses that unipolar signal train to produce an alarm signal which actuates an indicator.

In a particular embodiment, the system is designed for use with small aircraft and features an antenna which includes fixed RF feed means and a reflector that is mounted for movement relative to the RF feed means. This arrangement avoids the problems introduced by rotary joints. The reflector in a particular embodiment includes a body member of light weight low dielectric polymeric foam material with RF reflector material disposed on the surface of the body member and supplemental RF reflector means in the body member. The RF feed means is a coaxial transmission line having a plurality of circumferential slots spaced along its length that define radiating elements. A bearing sensor includes a series of spaced indicia and an indicia sensor, one mounted for movement with the reflector and one secured to the RF feed means. The antenna system is a compact, light weight, economical unit which transmits a well defined directional beam of RF energy and receives echos from targets on which the transmitted beam impinges.

In another aspect, the system features a code generator in the form of a shift register from which the primary code train and a plurality of secondary code trains are derived. Logic responsive to the antenna bearing sensor selects a range gate through which a particular one of the secondary code trains is transmitted for comparison with a reflected code train to provide an indication of the range of the target. Synchronizing logic responsive to the code generator switches the range gate selection at an optimum interval in each code train cycle.

In another feature of the invention, the system includes a DC/DC power conversion system. One of the code trains is applied to the power conversion system to establish the switching frequency of the power conversion system. In a particular embodiment, a low pass filter is employed to select the first spectral line of the code train and that spectral line establishes the switching frequency. With this apparatus, spurious signals or noise components in the power supply are forced to exist at the switching frequency determined by the code train and that frequency is rejected in the doppler detector.

Thus there is provided in accordance with the invention a moving target indicator which is particularly useful as an airborne system for monitoring adjacent aircraft. It will be understood that the system may have other applications such as detection of intrusion in a ground environment. The system is compact and economical. Other objects, features and advantages of the invention will be seen as the following description of a particular embodiment progresses, in conjunction with the drawings in which:

FIG. 3 is a perspective view of an antenna component of a moving target indicator system constructed in accordance with the invention;

FIG. 4 is a top view of the antenna shown in FIG. 3;

FIG. 5 is an elevational view of the RF feed component of the antenna shown in FIG. 3;

FIG. 6 is an enlarged view, with parts broken away, of components of the antenna unit;

DESCRIPTION OF PARTICULAR EMBODIMENT

The invention in this embodiment is incorporated in a solid state airborne radar system designed primarily for use in small aircraft but also useful in commercial aircraft to complement other collision avoidance systems. It is a non-cooperative system which provides bearing and distance information. The system is basically a short pulse radar system using suitable random coding techniques to increase its range and eliminate ambiguities.

Figure 1:
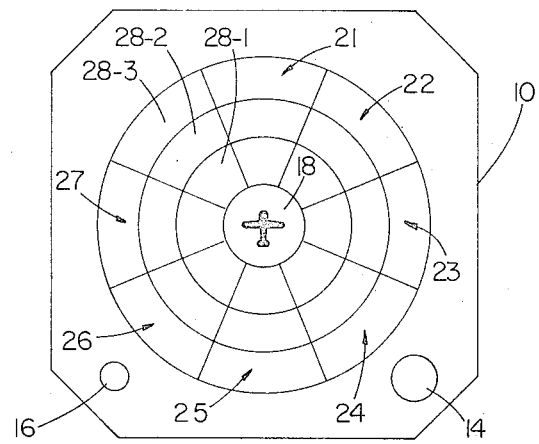
FIG. 1 is a diagram of an indicator employed in the system.

FIG. 1 shows the control and display panel 10 located in the cabin of the aircraft 12. The control panel includes a selector switch 14, a test switch 16, a system indicator lamp at the center 18 of the display panel; and a segment indicator lamp in each of the three ranges (−1, −2, −3) of each of the eight sectors 21-28. Each sector covers a 45° interval and is divided into three segments resulting in 24 segments, each of which can be illuminated and which designate a detected moving item located in the corresponding sector at approximately 1,500, 3,000, or 4,500 feet from the aircraft 12. Sector 21 (the top sector) covers ± 22.5° from the aircraft heading. All the sectors are thus related directly to the center line of the aircraft.

At maximum range of 4,500 feet, the system covers 1,000 feet above and below the aircraft. When flying at less than 1,000 feet altitude, therefore the system will pick up the earth and energize one or more indicators, thus providing as a secondary feature, a terrain avoidance capability.

Figure 2:
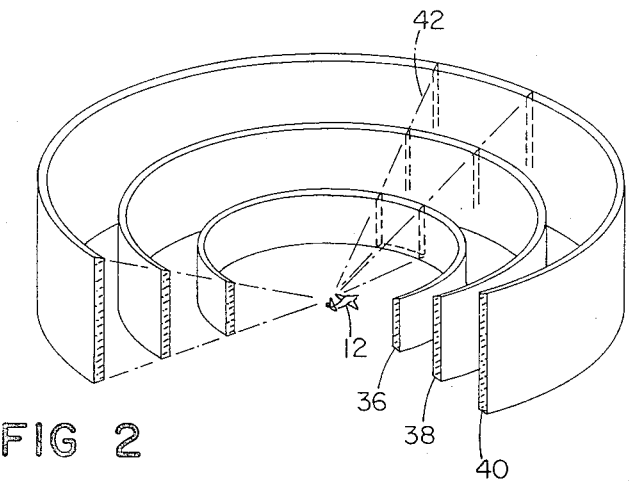
FIG. 2 is a diagram illustrating the concentric range coverage and bearing scan of a moving target indicator system constructed in accordance with the invention.

The system, as indicated in FIG. 2, includes a radome mounted on the vertical stabilizer of the aircraft 12. An antenna 34 is mounted in the radome 32 for rotation about a vertical axis. The radome is of teardrop configuration, 9 inches in diameter and 26 inches long. In this embodiment the antenna is driven in rotation and the system defines three range gates 36, 38, 40. Range gate 36 is at a distance of 1,500 feet from aircraft 12, range gate 38 is at a distance of 3,000 feet from the aircraft, and range gate 40 is at a distance of 4,500 feet from the aircraft. Each gate has a depth of 200 feet and its height is defined by the elevation angle of the transmitted beam. In this embodiment the transmitted beam 42 is 18° in azimuth and 25° in elevation.

Additional details of the antenna unit 34 will be seen with reference to FIG. 3. The antenna system includes a base housing 50 on which is mounted a bearing ring 52. A member 54 of light weight, low dielectric polymeric material such as a polyurethane foam is mounted on bearing ring 52 and has a rear surface 56 of parabolic configuration on which is deposited a metal layer 58 which functions as a reflector for RF signals. Member 54 has a cylindrical aperture 60 located coaxially with the axis of bearing ring 52. Disposed in front of cylindrical bore 60 is metallic rod 62 which functions as a subreflector to increase the gain of the antenna by redirecting a portion of the energy radiated from the feed in a direction away from reflector 56. Other supplemental reflector elements may be incorporated in member 54 as desired.

Fixedly supported on base 50 and extending through bearing ring 52 and bore 60 of member 54 along its axis is an antenna feed 70 in the form of a semi-rigid coaxial cable 72 having a central conductor 74, dielectric insulation 76 and an outer sheath 78. Three circumferential slots 80, 82, 84 are cut in jacket 78 and choke structures 86 are welded to the cable jacket 78 on either side of each slot. The choke structures are each one-quarter wavelength long, slots 80, 82 and 84 are spaced one wavelength apart, and an RF short circuit is formed at the upper end 88 of the cable, two-thirds wavelength from slot 80. In this configuration, each individual radiating slot generates a dipole type beam that is 60° in elevation and 360° in azimuth. The phased array configuration reduces the elevation beam angle to 25° and increases the directivity of the beam. The base of the feed 70, as indicated in FIG. 6 has a mounting flange 90 and an RF connector 92. It will be noted that no rotary joints are employed or required.

Mounted in housing 50 is a brushless DC motor 96 which is connected through spur gears 98, 100 having an 8:1 reduction ratio to drive ring 52 and antenna member 54 in rotation at 360 r.p.m. The rotation rate can be adjusted by means of a potentiometer in the DC motor controller.

Bearing ring 52 has a depending cylindrical outer flange 102 in which are formed a row of eight equally spaced holes 104 about its periphery and an additional (boresight) hole 106 below and aligned with one of octal holes 104. Disposed on the inside of cylindrical flange 102 is a transmitter light source that includes two light emitting diodes 108, 110 and aligned with diodes 108, 110 outside of flange 102 are two cooperating phototransistors 112, 114. Thus, as member 54 is driven through one complete rotation, transistor 112 produces eight output pulses, and for each complete revolution, transistor 114 produces one boresight pulse.

Figure 7:
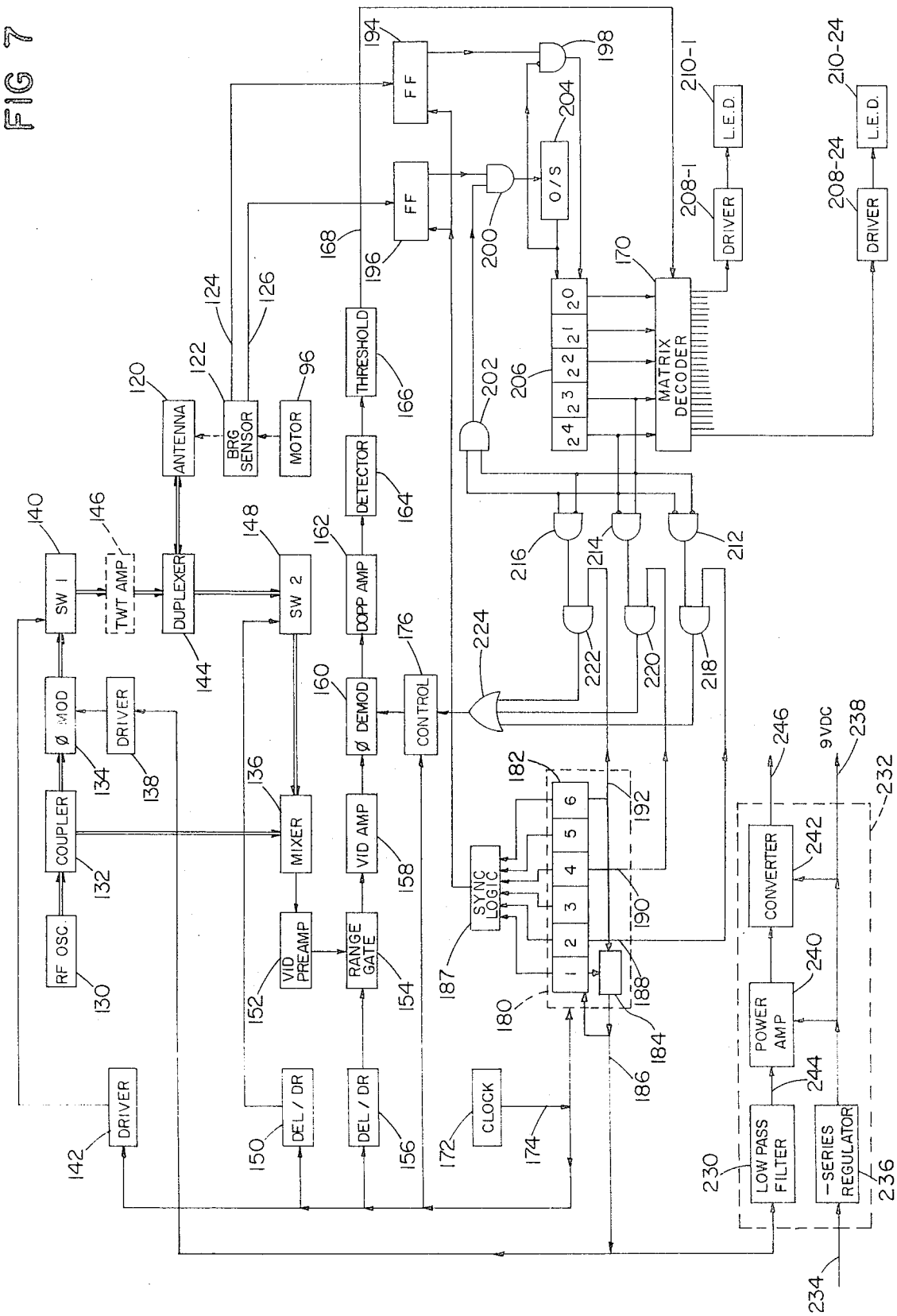
FIG. 7 is a block diagram of the moving target indicator system.

A block diagram of the radar system is shown in FIG. 7. The antenna is diagrammatically indicated at 120 and the bearing sensor, diagrammatically indicated at 122, produces an octal output on line 124 from transistor 112 and a boresight output on line 126 from transistor 114. The system also includes an RF oscillator 130 which in this embodiment is a triode type oscillator operating at 5.4 giga hertz with a power output of approximately 2 watts cw. The output of the oscillator is fed by a semi-rigid coax to a 27 db directional coupler 132 which passes 2 watts through to the phase modulator 134 and couples two milliwatts to mixer 136. Phase modulator 134 is a phase sensitive switch which introduces a 0° or a 180° lag to the RF signal as controlled by driver 138 which in turn is controlled by a pseudo-random code generated by code generator 180. RF switch 140 is a series switch controlled by driver 142 to pass the RF signal for 400 nanoseconds (about 25 percent of the PRF interval) to the duplexer 144. (An amplifying stage 146 as indicated by the dashed lines may be optionally included as desired.) The duplexer 144 is a circulator which directs the transmitted RF to the antenna 120 and applies echos received from antenna 120 via switch 148 to mixer 136. In both reverse directions, the duplexer acts as an isolator. Switch 148 is identical to switch 140 but is driven in the pass mode for a second or remaining portion of each PRF interval as controlled by delay driver 150.

Mixer 136 is of the balanced type and operates as a phase detector so that the product of the reference and echo inputs generates a bipolar video signal which is applied to video preamplifier 152 which has a five megahertz band width. Video preamplifier 152 preserves the shape of the video pulse train and amplifies the signal. The signal is then applied to range gate 154 which is controlled by delay driver 156 to further narrow the range gate, delay driver 156 being set to pass an echo at about 500-750 radar feet or multiples of the PRF. Video amplifier 158 also preserves the video shape and further amplifies the pulse train to preserve the system noise figure. Phase demodulator 160 is a correlation device which multiplies the echo coded pulse train with a delayed replica of the code.

If the two code trains match, all the bipolar phase components are converted to a unipolar pulse train with the doppler modulation retained. Doppler amplifier 162 then integrates the pulse train and its output is rectified by detector 164, that circuit including a low pass filter which shapes the signal and improves the signal-to-noise ratio. The output of detector 164 is passed through threshold circuit 166 to produce an echo or alarm signal on line 168 which is applied to matrix decoder 170.

System timing signals are derived from single phase crystal controlled digital clock 172 which produces output pulses at a 618 kilohertz pulse repetition frequency (PRF) on line 174. That clock pulse is applied to driver 142 to provide a transmitter gate pulse 400 nanoseconds in width; to delay driver 150 to produce a receiver gate pulse 810 nanoseconds in width that is delayed 810 nanoseconds from the leading edge of transmitter gate pulse to control switch 148; to delay driver 156 to produce a 400 nanosecond output pulse, the leading edge of which is delayed approximately 290 nanoseconds from the start of the receiver gate pulse; and a synchronizing sample pulse to flip flop control 176.

Figure 9:
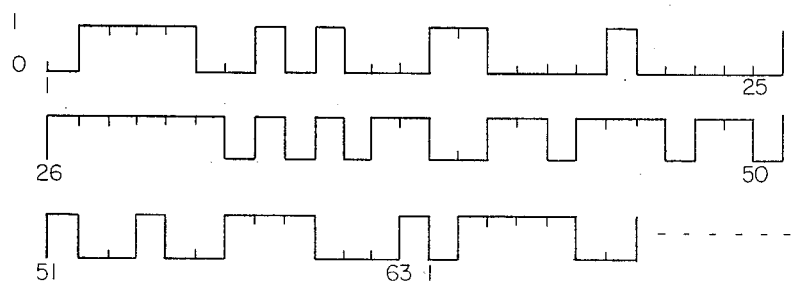
FIG. 9 is a diagram indicating the nature of the pseudo-random code generated by the code generator.
Figure 8:
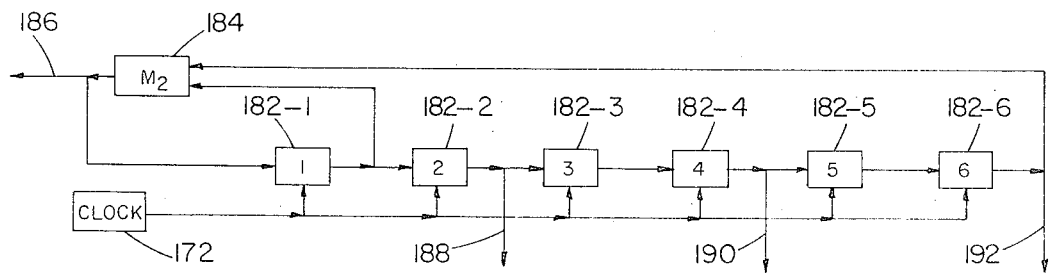
FIG. 8 is a block diagram showing additional details of the code generator.

The PRF signal on line 174 is also applied to code generator 180 which includes a shift register 182 having six stages 182–1 –6. A modulo 2 feedback logic element 184 of the exclusive OR type as indicated in FIG. 8 is coupled to the outputs of stages 1 and 6 and its output controls the next state of stage 182–1 and also provides the pseudo-random code over line 186. The resulting "pseudo random" series of pulses is indicated in FIG. 9, the series containing 63 bits that is repeated in the same order. Lines 188, 190 and 192 are coupled to the second, fourth and sixth shift register stages, respectively, and transmit the secondary, code train.

With reference again to FIG. 7, a decoder 187 coupled to the outputs of code generator 180 selects a favorable portion of the code sequence that produces an output which resets flip flops 194 and 196. Flip flop 194 is set by the octal pulse on line 124 and flip flop 196 is set by the boresight pulse on line 126. In response to a reset pulse each flip flop, when in set state, produces an output pulse, the output pulse from flip flop 194 being applied to logic unit 198 and the output pulse from flip flop 196 being applied to AND circuit 200. AND circuit 200 has a second conditioning input from AND circuit 202 and when both inputs are conditioned an output is produced which triggers one shot 204. The output of one shot 204 is applied to reset five stage binary counter 206 and also to the inhibit input of logic 198. The outputs of counter 206 are applied to matrix decoder 170 to condition a corresponding one of 24 gates to pass an alarm signal, if such is present on line 168, to the corresponding driver 208 and indicating light emitting diode 210 of the indicator system to provide an indication of the particular sector and range location of the target generating the alarm signal on line 168.

The fourth and fifth stages of counter 206 are coupled to decoding logic units 212, 214, 216 and their outputs are applied through corresponding range select gates 218, 220, 222 through OR circuit 224 to the demodulator control 176. Gate 218 has a second input from the second stage of code generator 180 over line 188; gate 220 has a second input from the fourth stage of generator 180 over line 190; and gate 222 has an input from the sixth stage of generator 180 over line 192.

The output of the generator 180 over line 186 is applied to driver 138 to modulate the transmitted RF signal and also to low pass filter 230 of the power supply unit 232. Line voltage (14/28 volts DC) is applied over line 234 to the series regulator 236 to provide a regulated nine volt DC output on line 238. Line voltage is also applied to the power amplifier 240 and to the AC/DC converter 242. The 63 bit code applied to the low pass filter 230 and that filter passes the first spectral line which appears at 10 kilohertz and produces a "tone" signal on line 244 which is phase locked to the PRF and is used as the ripple switching frequency of the AC/DC converter 242 so that DC system power is provided on line 246 (e.g. −420 volts DC).

In operation, in each PRF cycle the radar system transmits a 400 nanosecond pulse of RF energy at 5.4 gigahertz. This pulse corresponding to a two-way radar range gate of 200 feet. These pulses are repeated every 1,620 nanoseconds at the PRF of approximately 618 kilohertz. The range for detection is thus at increments of 810 feet. Ambiguities in range are eliminated through the use of the pseudo-random coding of the transmitted pulse by modulating the phase of the transmitted pulse in accordance with the output of code generator 180. The receiver compares the phase sense of an echo pulse train with a delayed replica applied over a selected one of lines 188, 190 or 192 through logic 176. For example if the target was at 3,000 feet, the phase varying pulse train would be delayed in space four pulse intervals and would match the delayed pulse train from the code generator over line 190 and through range gate 220.

Thus, one of a series of range gates, each 200 feet in width as determined by delay driver 156, is selected by the setting of the range gate selector logic in response to counter 206. Through the use of the pseudo-random coding, where the two codes match in delay time, all of the bipolar phase components of the signal from the video amplifier 158 are converted to a unipolar pulse train. If the codes do not match, the product becomes another form of the same bipolar train, that is a pulse train in which there is a difference of one between the number of positive and negative pulses. The average value of this bipolar train is 1/63 of the average value of the unipolar pulse train and its doppler modulation is rejected by the same amount (32 db).

The switching of the range gates 218, 220, 222 is controlled by logic 187 which selects a point in the pseudo-random code where there is a minimal buildup of energy in the doppler filter due to switching leakage so that the range gate switching transient is minimized. In this particular embodiment the selected code is 011100. In each cycle of the code (approximately every 100 microseconds) a word sync pulse is generated from logic 187 to sample clear flip flops 194 and 196. If either is set by the bearing sensor 122 a synchronized output pulse will be generated. Flip flop 194 is set every 21 milliseconds by the octal output of the bearing sensor on line 124 and flip flop 196 is set every 168 milliseconds by boresight output on line 126 from the bearing sensor. The resetting of flip flop 194 produces an output which is passed by logic 198 to step counter 206 (unless a boresight signal is simultaneously generated and AND logic 202 is conditioned in which case counter 206 is reset rather than being stepped). Thus, initially counter 206 is reset and is stepped in response to each octal pulse on line 124 synchronized with the output of code generator 180. The first eight outputs of counter 206 condition logic 212 to provide a conditioning input to range gate 218 to apply the coded pulse train delayed two intervals through OR circuit 224 and control 176 to phase demodulator 160 to define the 1500 foot range gate. The ninth pulse sets the fourth stage of counter 206, removing a conditioning level from logic 212 and conditioning logic 214 to condition range gate 220 to select the 3,000 foot range (a delay of four intervals). The 17th pulse conditions logic 216 which in turn conditions the third range gate 222 to pass a coded pulse train delayed six intervals through control 176 for the 4,500 foot range gate. The 25th pulse conditions logic 202 and its output provides a conditioning output to logic 200. In response to the next boresight signal on line 126, one shot 204 has an output which resets counter 206 to repeat the indicator cycle.

Thus, during each interval of scan one of the sector gates in matrix decoder 170 is conditioned corresponding to a particular sector and range. If an alarm or echo signal is generated on line 168, that signal is passed by matrix decoder 170 to energize the corresponding light emitting diode indicator 210 on the display 10 shown in FIG. 1 to provide an indication of an intruding aircraft, thus permitting the pilot to appropriately maneuver to avoid a midair collision. Since the system is continuously interrogating all the sectors and ranges in discrete bits, the system can handle more than one intruder at a time. The system is completely solid state, light in weight and low in cost and thus provides an effective airborne warning system that is particularly useful for general aviation aircraft.

While a particular embodiment of the invention has been shown and described, various modifications thereof will be apparent to those skilled in the art, and therefore it is not intended that the invention be limited to the disclosed embodiment or to details thereof and departures may be made therefrom within the spirit and scope of the invention as defined in the claims.

What is claimed is:

1. A moving target indicator system comprising a signal source for generating an output signal,
   code generator means for generating a primary code train and at least one secondary code train delayed relative to said primary code train,
   modulator means responsive to said primary code train to modulate said output signal to produce a coded output signal,
   antenna means for transmitting in a directional beam said coded output signal and for receiving coded signals reflected by targets remote from said antenna means, said antenna means including fixed RF feed means and reflector means mounted for movement relative to said RF feed means,
   comparison means for comparing said reflected coded signals and said secondary code train and producing a unipolar signal train with doppler modulation information as a function of relative movement between said antenna means and a target producing said reflected coded signals in response to a matching relation between said reflected coded signals and said secondary code train,
   doppler modulation detector means responsive to said unipolar train for producing an alarm signal,
   and indicator means responsive to said alarm signal for producing an indication of the location of a target relative to said antenna means.

2. The system as claimed in claim 1 wherein said code generator means generates said primary code train and a plurality of secondary code trains and further including selector means for applying a selected one of said secondary code trains to said comparison means.

3. The system as claimed in claim 2 and further including means for moving said antenna means in a scanning pattern, bearing sensor means for producing signals indicative of the orientation of said antenna means and means responsive to said antenna orientation signals for controlling said selector means.

4. The system as claimed in claim 3 wherein said antenna moving means causes said radiated beam to rotate about an axis, said bearing sensor means produces a series of antenna orientation signals as said radiated beam is rotated about said axis, said antenna orientation signal responsive means includes a counter, and logic responsive to said counter for controlling said selector means.

5. The system as claimed in claim 4 and further including matrix decoder means responsive to said counter for controlling the application of said alarm signals to said indicator means.

6. The system as claimed in claim 2 and further including synchronizing logic responsive to said code generator means for operating said selector means at a predetermined setting of said code generator means.

7. The system as claimed in claim 2 wherein said code generator means includes a multistage shift register and said code train deriving means is coupled to a plurality of different stages of said shift register as a function of the relation between said primary and secondary code trains.

8. A moving target indicator system comprising a signal source for generating an output signal,
   code generator means for generating a primary code train and at least one secondary code train delayed relative to said primary code train, DC/DC power conversion means including frequency sensitive means, means for applying one of said code trains to said frequency sensitive means to phase lock the conversion frequency of said power conversion means to the PRF of said code generator means,
   modulator means responsive to said primary code train to modulate said output signal to produce a coded output signal,
   antenna means for transmitting in a directional beam said coded output signal and for receiving coded signals reflected by targets remote from said antenna means,
   comparison means for comparing said reflected coded signals and said secondary code train and producing a unipolar signal train with doppler modulation information as a function of relative movement between said antenna means and a target producing said reflected coded signals in response to a matching relation between said reflected coded signals and said secondary code train,
   doppler modulation detector means responsive to said unipolar signal train for producing an alarm signal,
   and indicator means responsive to said alarm signal for producing an indication of the location of a target relative to said antenna means.

9. The system as claimed in claim 8 wherein said code generator means includes multistage shift register means, said primary code train and a plurality of secondary code trains being derived from different stages of said shift reigster means and further including selector means for applying a selected one of said secondary code trains to said comparison means.

10. The system as claimed in claim 9 and further including synchronizing logic responsive to said multistage shift register for operating said selector means at a predetermined setting of said multistage shift register.

11. The system as claimed in claim 10 and further including means for moving said antenna means in a scanning pattern, bearing sensor means for producing signals indicative of the orientation of said antenna means and means responsive to said antenna orientation signals for controlling said selector means.

12. The system as claimed in claim 11 wherein said antenna moving means causes said radiated beam to rotate about an axis said bearing sensor means produces a series of antenna orientation signals as said radiated beam is rotated about said axis, said antenna orientation signal responsive means includes a counter, and logic responsive to said counter for controlling said selector means.

13. The system as claimed in claim 12 and further including matrix decoder means responsive to said counter for controlling the application of said alarm signals to said indicator means.

14. The system as claimed in claim 1 wherein said RF feed means is an elongated member defining an axis and said reflector means is mounted for rotation about said axis.

15. The system as claimed in claim 14 wherein said reflector means includes a body member of light weight low dielectric material and RF selector material disposed on a surface of said body member.

16. The system as claimed in claim 15 and further including supplemental RF reflector means in said body member.

17. The system as claimed in claim 14 wherein said RF feed means includes a plurality of said radiating elements spaced along the length of said elongated member.

18. The system as claimed in claim 17 wherein said RF feed member is a coaxial transmission line having a central inner conductor, a tubular outer conductor and dielectric material disposed between said inner and outer conductors, and each said radiating element is defined by a circumferential slot in said outer conductor.

19. The system as claimed in claim 14 and further including bearing sensor means including indicia means carrying a series of equally spaced indicia and sensor means responsive to said indicia for providing an indication of the orientation of said reflector means one of said indicia means and said sensor means being mounted for movement with said reflector means and the other fixed to said RF feed means.

20. The system as claimed in claim 19 wherein said code generator means generates said primary code train and a plurality of secondary code trains and further including means for moving said reflector means in a scanning pattern, said bearing sensor means producing signals indicative of the orientation of said reflector means, selector means for applying a selected one of said secondary code trains to said comparison means, and means responsive to said reflector orientation signals for controlling said selector means.

21. The system as claimed in claim 20 wherein said reflector means causes said radiated beam to rotate about the axis of said RF feed means, said bearing sensor means produces a series of reflector orientation signals as said radiated beam is rotated about said axis, and said reflector orientation signal responsive means includes a counter, and logic responsive to said counter for controlling said selector means.

22. The system as claimed in claim 21 and further including matrix decoder means responsive to said counter for controlling the application of said alarm signals to said indicator means.

23. The system as claimed in claim 22 and further including synchronizing logic responsive to said code generator means for operating said selector means at a predetermined setting of said code generator means.

24. The system as claimed in claim 23 and further including DC/DC power conversion means including frequency sensitive means and means for applying one of said code trains to said frequency sensitive means to phase lock the conversion frequency of said power conversion means to the PRF of said code generator means.

25. The system as claimed in claim 24 wherein said code generator means includes multistage shift register means, said primary code train and a plurality of secondary code trains being derived from different stages of said shift register means.

* * * * *

UNITED STATES PATENT OFFICE
CERTIFICATE OF CORRECTION

Patent No. 3,790,938           Dated February 5, 1974

Inventor(s) Richard W. Anderson et al.

It is certified that error appears in the above-identified patent and that said Letters Patent are hereby corrected as shown below:

Column 7, claim 1, line 54, after "unipolar" insert --signal--.

Column 9, claim 15, line 25, change "selector" to --reflector--;
claim 17, line 31, delete "said".

Column 10, claim 21, line 16, after "reflector" insert --moving--.

Signed and sealed this 14th day of May 1974.

(SEAL)
Attest:

EDWARD M. FLETCHER, JR.
Attesting Officer

C. MARSHALL DANN
Commissioner of Patents